(12) United States Patent
Akins

(10) Patent No.: US 10,710,420 B2
(45) Date of Patent: Jul. 14, 2020

(54) JACKKNIFE PREVENTION DEVICE

(71) Applicant: Jack Akins, Coffeeville, AL (US)

(72) Inventor: Jack Akins, Coffeeville, AL (US)

(*) Notice: Subject to any disclaimer, the term of this patent is extended or adjusted under 35 U.S.C. 154(b) by 0 days.

(21) Appl. No.: 15/723,618

(22) Filed: Oct. 3, 2017

(65) Prior Publication Data

US 2018/0093539 A1  Apr. 5, 2018

Related U.S. Application Data

(60) Provisional application No. 62/403,999, filed on Oct. 4, 2016.

(51) Int. Cl.
*B60D 1/30* (2006.01)
*B60D 1/56* (2006.01)
*B60D 1/62* (2006.01)

(52) U.S. Cl.
CPC .............. *B60D 1/305* (2013.01); *B60D 1/56* (2013.01); *B60D 1/62* (2013.01)

(58) Field of Classification Search
CPC .......... B60D 1/305; B60D 1/30; B60D 1/363; B60D 1/36; F16B 39/10
See application file for complete search history.

(56) References Cited

U.S. PATENT DOCUMENTS

| | | | |
|---|---|---|---|
| 3,420,549 A * | 1/1969 | Robinson | B60D 1/363 280/477 |
| 3,588,809 A * | 6/1971 | Devlin | B60D 1/36 340/431 |
| 4,613,265 A * | 9/1986 | Visinand | B25B 13/065 411/120 |
| 6,254,118 B1 | 7/2001 | Dudley | |
| 6,268,800 B1 | 7/2001 | Howard | |
| 7,237,792 B2 | 7/2007 | Mrofka et al. | |
| 2005/0280246 A1 | 12/2005 | Mrofka | |
| 2008/0217885 A1 * | 9/2008 | Woolever | B60D 1/363 280/477 |

* cited by examiner

*Primary Examiner* — Joseph M Rocca
*Assistant Examiner* — Harold Eric Pahlck, III
(74) *Attorney, Agent, or Firm* — Matthew M. Googe; Robinson IP Law, PLLC

(57) ABSTRACT

A jackknife prevention device installed on a vehicle includes: a base plate mounted at a trailer hitch of the vehicle adjacent to a ball mount; a first arm pivotally associated with the base plate at a proximal end of the first arm and including a bumper portion located thereon, the first arm movable between a first position and second position; and a second arm pivotally associated with the base plate at a proximal end of the second arm, the second arm including a bumper portion located thereon, the second arm extending in a direction that is divergent from a direction of the first arm, the second arm movable between a first position and a second position. The first arm and second arm are releasably engaged with the base plate to pivot between the first and second positions.

10 Claims, 7 Drawing Sheets

JACKKNIFE PREVENTION DEVICE

CROSS-REFERENCE TO RELATED APPLICATION

This application claims priority to U.S. Provisional Patent Application No. 62/403,999 for "No Jack" and filed on Oct. 4, 2016, the contents of which are incorporated herein by reference in its entirety.

FIELD

This disclosure relates to a vehicle attachment. More particularly, this disclosure relates to a device attached to a truck for prevention of jackknifing of a trailer being towed by the truck.

BACKGROUND

It is an object of the present disclosure to improve safety and stability when towing. The device of the present disclosure would provide safety, control, and peace of mind to concerned motorists. Instead of experiencing shifting to one side of a towed trailer, the device of the present disclosure would restrict movement to avoid possible jackknifing of a trailer. The device of the present disclosure would promote a high level of towing safety so costly truck damage may be avoided while also reducing dangers to other motorists.

The device of the present disclosure will further keep insurance costs low and provide peace of mind for safety-conscious trailer owners. Additionally, the device of the present disclosure would be very strong, reliable, affordable, and adaptable to different trailers.

SUMMARY

The above and other needs are met by a device for preventing jackknifing of a trailer relative to a tow vehicle. In a first aspect, a jackknife prevention device installed adjacent a trailer hitch of a vehicle includes: a base plate mounted at the trailer hitch of the vehicle adjacent to a ball mount of the trailer hitch; a first arm pivotally associated with the base plate at a proximal end of the first arm, the first arm including a bumper portion located at a distal end of the first arm, the first arm pivotable between a first position and second position; a second arm pivotally associated with the base plate at a proximal end of the second arm, the second arm including a bumper portion located at a distal end of the second arm, the second arm extending in a direction that is divergent from a direction of the first arm, the second arm pivotable between a first position and a second position. In the first position the first arm and second arm are releasably engaged with the base plate to maintain the first arm and second arm such that the first arm and second arm are parallel to a back bumper of the vehicle. In the second position the first arm and second arm are releasably engaged with the base plate such that the first arm and second arm are retained at an angle between parallel and perpendicular to the back bumper of the vehicle.

In one embodiment, each of the first arm and second arm further includes a contact switch located adjacent to the bumper portion and a control module in electronic communication with the contact switch of the first arm and second arm, wherein the control module activates an alert when a portion of a trailer contacts either of the contact switches on the first arm and second arm.

In another embodiment, base plate further includes at least a first set of bores formed through the base plate corresponding to the first position of the first arm and second arm, the first set of bores aligned with bores formed through the proximal end of the first arm and the second arm.

In yet another embodiment, the device further includes a second set of bores formed through the base plate corresponding to the second position of the first arm and second arm, the second set of bores aligned with the bores formed through the first arm and the second arm.

In one embodiment, the jackknife prevention device further includes one or more bolts inserted through one of the first set of bores and the second set of bores and through the bores formed through the first arm and the second arm to secure the first arm to the second arm in one of the first position and the second position.

In another embodiment, the base plate further includes a pair of retention mechanisms located adjacent the first set of bores formed through the base plates, the pair of retention mechanisms for securing one or more bolts through the first set of bores and the bores of the first arm and the second arm.

In yet another embodiment, the retention device includes a retention member movably associated with the base plate between an open position and closed position, the retention member biased towards a closed position and shaped to engage a head of the one or more bolts to prevent the one or more bolts from backing out of the first set of bores.

In one embodiment, the head of the one or more bolts includes a groove formed therein, wherein the retention member engages the groove of the head of the one or more bolts when the retention member is in the closed position.

In another embodiment, the device further includes a second pair of retention mechanisms located adjacent a second set of bores formed through the base plates corresponding to the second position of the first arm and the second arm, the second pair of retention mechanisms for securing the one or more bolts through the second set of bores and the bores of the first arm and the second arm when the first arm and second arm are in the second position.

In a second aspect, a jackknife prevention device installed adjacent a trailer hitch of a vehicle includes: a base plate mounted at the trailer hitch of the vehicle adjacent to a ball mount of the trailer hitch, the base plate further including a first set of bores formed through the base plate and a second set of bores formed through the second plate; a first arm pivotally associated with the base plate at a proximal end of the first arm, the first arm including a bumper portion located at a distal end of the first arm, the first arm further including at least one bore formed through the first arm and aligned with the first set of bores of the base plate when the first arm is in a first position and the second set of bores of the base plate when the first arm is in a second position; a second arm pivotally associated with the base plate at a proximal end of the second arm, the second arm including a bumper portion located at a distal end of the second arm, the second arm further including at least one bore formed through the second arm and aligned with the first set of bores of the base plate when the second arm is in a first position and the second set of bores of the base plate when the first arm is in a second position, the second arm extending in a direction that is divergent from a direction of the first arm. In the first position the first arm and second arm are releasably engaged with the base plate with one or more bolts inserted through one of the first and second set of bores and the bores on the first arm and the second arm to maintain the first arm and second arm in one of the first and second positions.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Embodiments of the present disclosure include a receive hitch attachment for vehicles that is configured to resist jackknifing of a trailer towed behind a vehicle. The device of the present disclosure would provide improved overall support, safety, and protection when towing a trailer in traffic by preventing possible jackknifing of the trailer.

Figure 1:
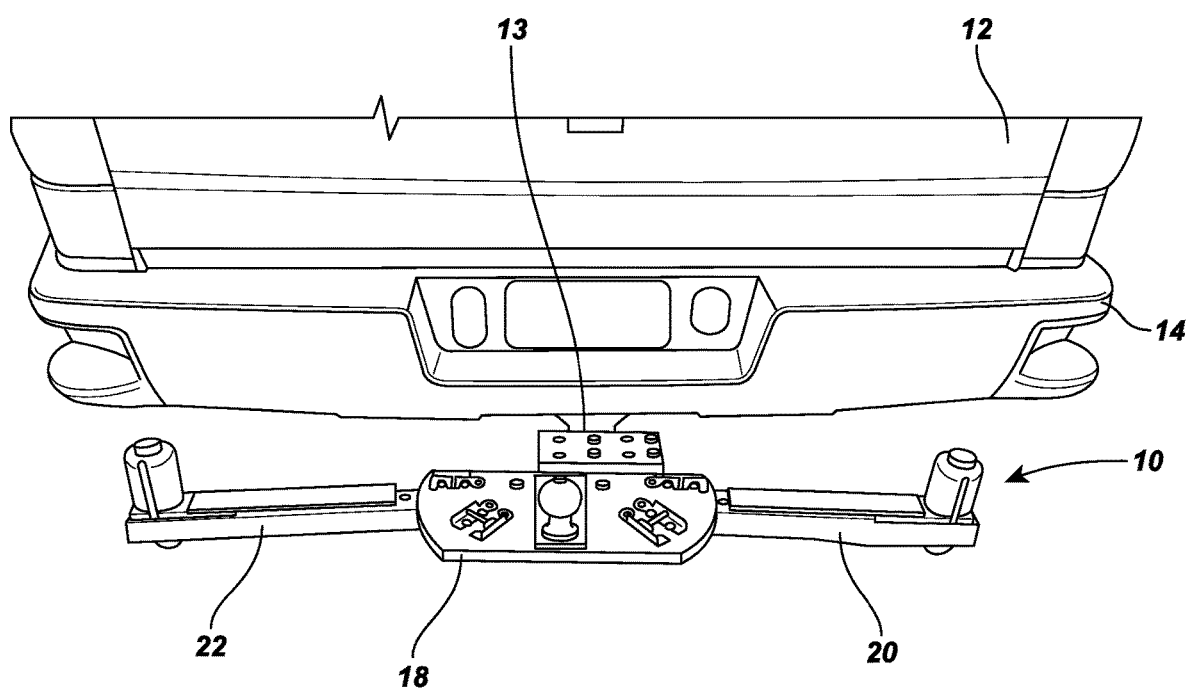
FIG. 1 shows a rear view of a jackknife prevention device according to one embodiment of the present disclosure.

FIG. 1 shows a basic embodiment of a jackknife prevention device 10 for preventing jackknifing of a trailer relative to a vehicle 12 towing the trailer. The jackknife prevention device is preferably attached to the vehicle 12 adjacent a tow point of the vehicle 12, such as adjacent a tow hitch 13 located at a rear of the vehicle 12 and adjacent the vehicle's rear bumper 14. The jackknife prevention device is readily attached to the vehicle, such as at a receiver hitch 16 of the vehicle, and prevents or reduces the likelihood of a trailer that is towed by the vehicle jackknifing and contacting or causing damage to the vehicle.

Figure 2:
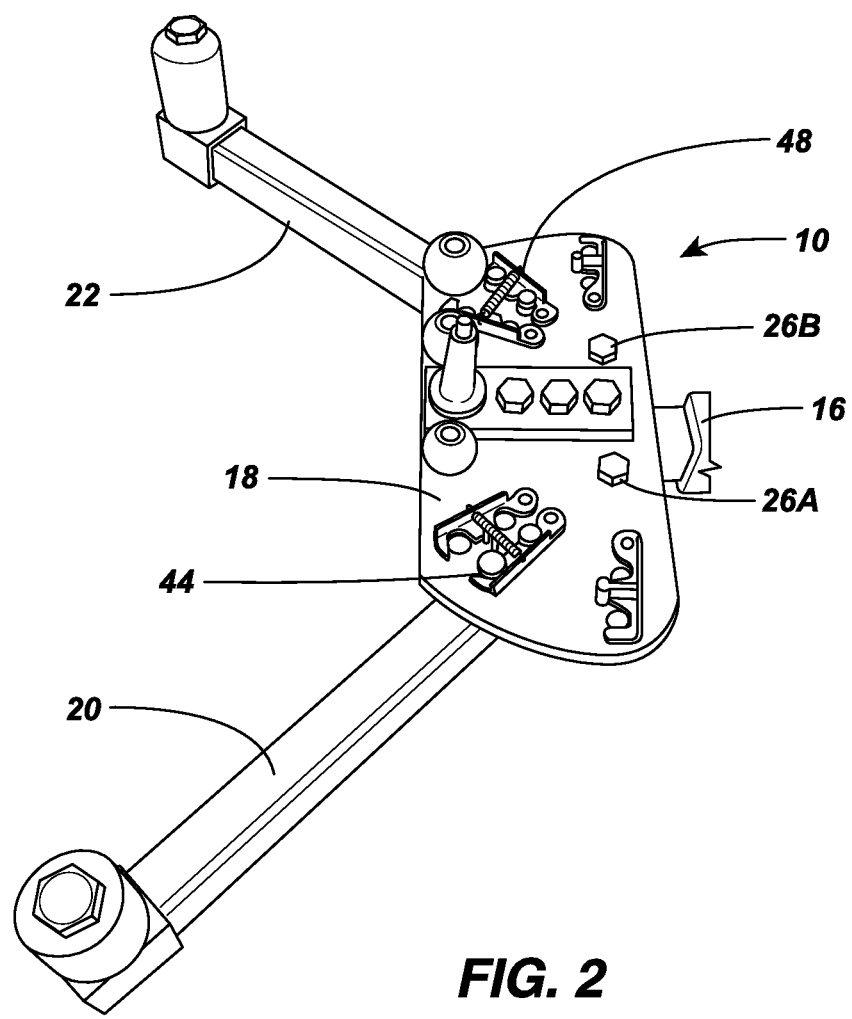
FIG. 2 shows a perspective view of a jackknife prevention device in a second position according to one embodiment of the present disclosure.

The jackknife prevention device 10 includes a base plate 18 that is mounted to the receiver hitch 16 of the vehicle 12. A first arm 20 and a second arm 22 are pivotally associated with the base plate 18 such that the first arm 20 and second arm 22 are both capable of moving between a first position, as illustrated in FIG. 1, and a second position that is shown in FIG. 2. The base plate 18 is preferably formed from a steel plate, such as ⅜" steel. The base plate 18 is mounted adjacent a ball mount 24 located at the receiver hitch 16 for receiving a tongue of a trailer on the ball mount 24. The base plate 18 preferably has a tapered shape such that a width of the base plate tapers from a wider portion adjacent to the bumper 14 of the vehicle 12 to a narrow portion that is distal from the bumper 14. In an alternative embodiment, a width of the base plate may be tapered such that a narrow portion of the base plate 18 is adjacent the bumper 14 and a wider portion is distal from the bumper.

Figure 3:
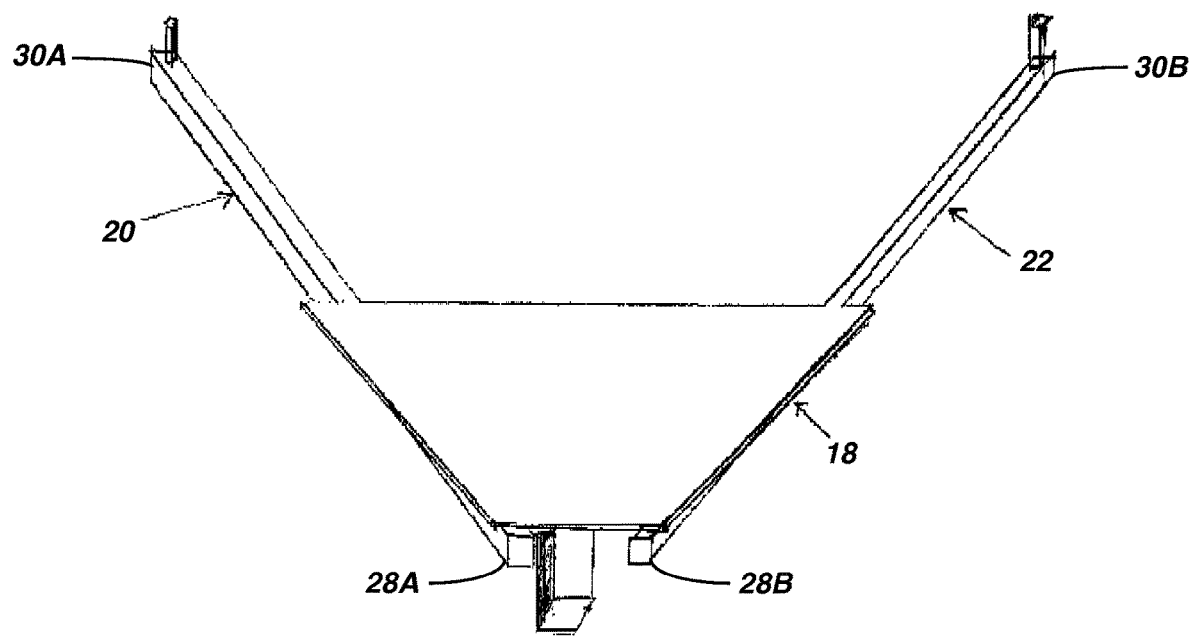
FIG. 3 shows a schematic view of first and second arms of a jackknife prevention device according to one embodiment of the present disclosure.

The first arm 20 and the second arm 22 are pivotally associated with the base plate 18 such that the first arm 20 and second arm 22 pivot between a first position (FIG. 1) and a second position (FIG. 2). The first arm 20 and second arm 22 are preferably pivotally attached to the base plate 1, such as with pivot bolts 26A and 26B inserted through the base plate 18 and at least a portion of the first arm 20 and second arm 22. The first arm 20 and second arm 22 are preferably formed of steel, and are preferably formed from an elongate section of 2" square tubing. As shown in FIG. 3, the first arm 20 and second arm 22 extend from a proximal end 28A and 28B that is adjacent bolts 26A and 26B to a distal end 30A and 30B that is distal from the base plate 18.

Referring again to FIGS. 1 and 2, the first arm 20 and second arm 22 both include a bumper portion 32A and 32B located at the distal end 30A and 30B of the first arm 20 and second arm 22. The bumper portion 32A and 32B of each of the first arm 20 and second arm 22 preferably extend upright and perpendicular to a length of the first arm 20 and second arm 22. The bumper portion 32A and 32B is preferably formed of a resiliently flexible material, such as a rubber or flexible polymer such that the bumper portion 32A and 32B may contact a trailer as described below without causing substantial damage to the trailer.

Figure 4:
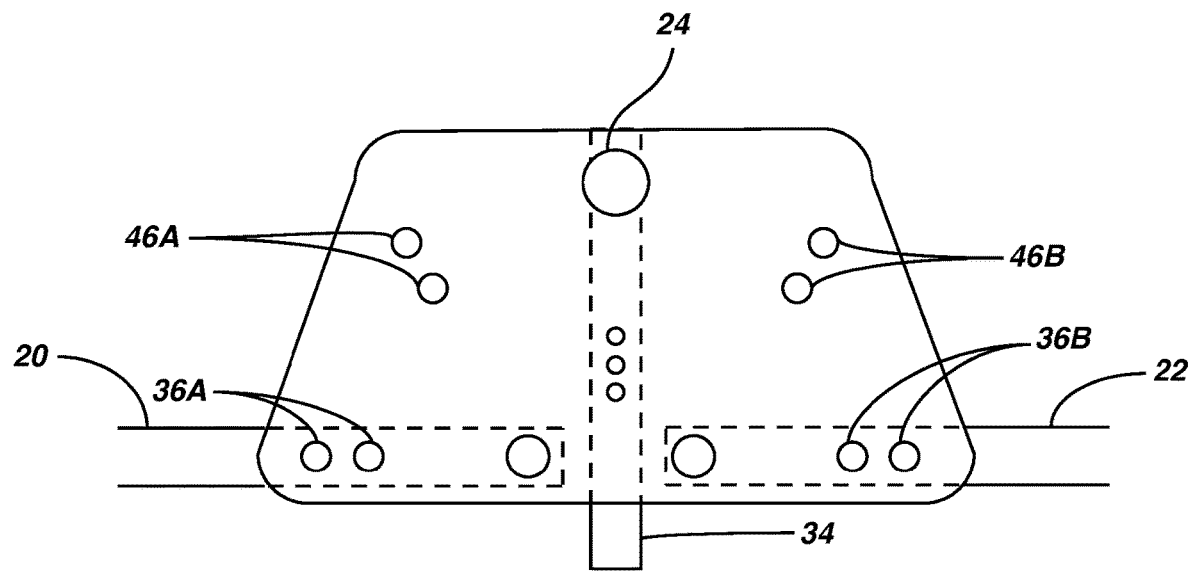
FIG. 4 shows a top view of a jackknife prevention device in a first position according to one embodiment of the present disclosure.
Figure 5:
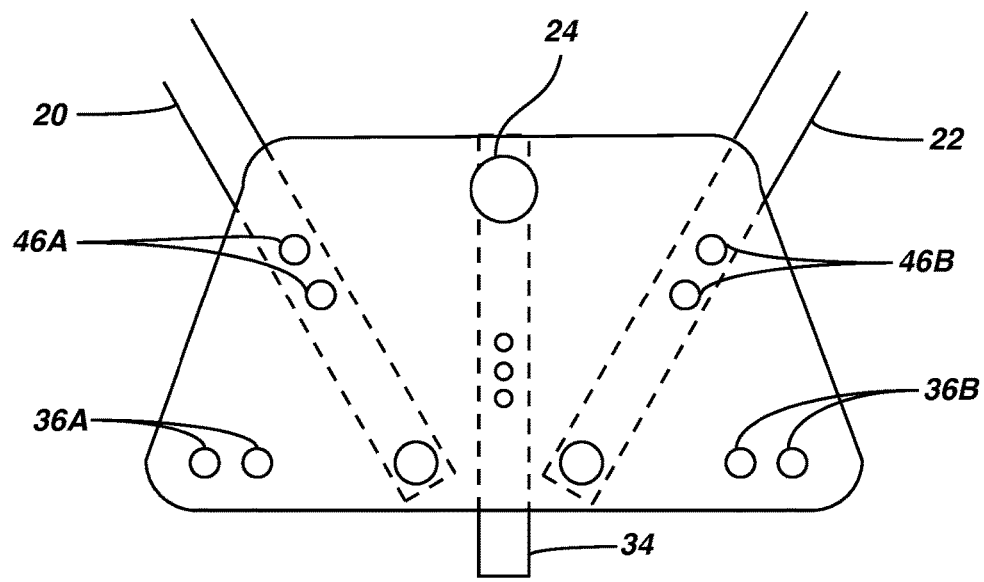
FIG. 5 shows a top view of a jackknife prevention device in a second position according to one embodiment of the present disclosure
Figure 6:
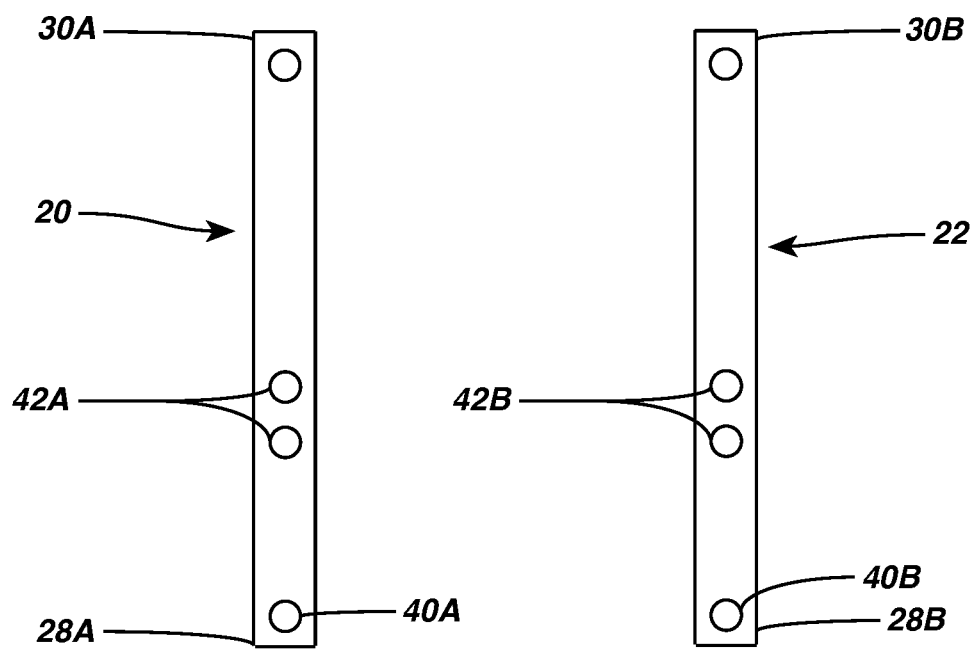
FIG. 6 shows a top view of a first arm and second arm of a jackknife prevention device according to one embodiment of the present disclosure.

Referring now to FIGS. 4 and 5, the base plate 18 may be secured to a central support member 34 that is shaped to be inserted into the receiver hitch 16 of the vehicle 12. The base plate 18 further preferably includes a set of first position bores 36A and 36B that are radially aligned in relation to pivot bores 38A and 38B. The pivot bores 38A and 38B of the base plate 18 are shaped to receive the pivot bolts 26A and 26B through the base plate 18 and into pivot bores 40A and 40B of the first arm 20 and second arm 22 (FIG. 6). The set of first position bores 36A and 36B are aligned with position bores 42A of the first arm and position bores 42B of the second arm when the first arm 20 and the second arm 22 are in the first position shown in FIG. 4. One or more pins 44 (FIG. 2) are inserted through the first position bores 36A and 36B of the base plate and the position bores 42A and 42B of the first arm 20 and second arm 22 to secure the first arm 20 and second arm 22 in the first position shown in FIG. 4.

With further reference to FIGS. 4 and 5, the base plate 18 also includes a set of second position bores 46A and 46B formed through the base plate 18. The second position bores 46A and 46B are also preferably radially aligned with the pivot bores 38A and 38B of the base plate 18. The second position bores 46A and 46B are preferably oriented at an angle of between about 10 and about 80 relative to the set of first position bores 36A and 36B. More preferably, the second position bores 46A and 46B are positioned at an angle of from about 35 to about 65 relative to an angle of the set of first position bores 36A and 36B. The set of second position bores 46A and 46B are aligned with the position bores 42A and 42B of the first arm 20 and second arm 22.

The first arm 20 and second arm 22 are secured in the second position of FIG. 5 by inserting the one or more pins 44 through the second position bores 46A and 46B and the position bores 42A and 42B of the first arm 20 and second arm 22.

Figure 7:
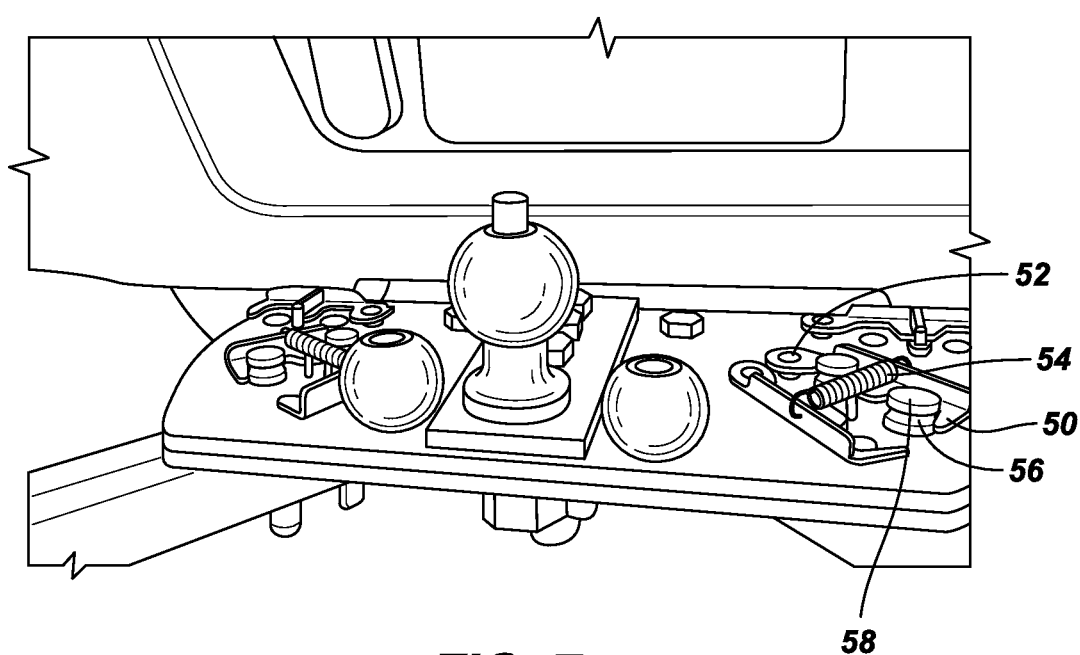
FIG. 7 shows a close-up view of a base plate of a jackknife prevention device according to one embodiment of the present disclosure.

Referring now to FIG. 7, the one or more pins 44 are captively engaged with the first arm 20 and second arm 22 in one of the first position and the second position with a retention mechanism 48 that prevents the one or more pins 44 from disengaging the first arm 20 and second arm 22. The retention mechanism 48 includes a retention member 50 that is movably attached to the base plate 18, such as at pivot 52. The retention member 50 is biased towards a closed position, such that the retention member 50 is adjacent to one of the set of first position bores 36A and 36B and the set of second position bores 46A and 46B. The retention member 50 is preferably biased with a spring 54. When the retention member is in the closed position, an edge of the retention member 50 engages a groove 56 formed in a head 58 of the one or more pins 44, thereby preventing the one or more pins 44 from disengaging the set of first position bores 36A and 36B and the set of second position bores 46A and 46B. To disengage the one or more pins 44, the retention member 50 is moved to an open position such that the retention member 50 does not contact the groove 56 of the one or more pins 44, thereby allowing the one or more pins 44 to be removed.

Referring to FIG. 1, the jackknife prevention device 10 is preferably installed on a trailer hitch 13 of a vehicle 12. When a trailer is not attached to the vehicle 12, the first arm 20 and second arm 22 are preferably located in the first position wherein the first arm 20 and second arm 22 are substantially parallel to the rear bumper 14 of the vehicle 12. The first position of the first arm 20 and second arm 22 reduces a distance that the first arm 20 and second arm 22 extend from a rear end of the vehicle 12. When a user desires to tow a trailer, the first arm 20 and second arm 22 are pivoted to the second position shown in FIG. 2. To pivot the first arm 20 and second arm 22 from the first position to the second position, the user first disengages the retention mechanism 48 and removes the one or more pins 44 securing the first arm 20 and second arm 22 in the first position. The first arm 20 and second arm 22 are rotated until the position bores 42A and 42B of the first arm 20 and second arm 22 are aligned with the set of second position bores 46A and 46B. The one or more pins are inserted through the second position bores 46A and 46B and the position bores 42A and 42B of the first arm 20 and second arm 22. The retention mechanism 48 engages the groove 56 of the one or more pins 44 to secure the pins 44 through the base plate 18 in the second position.

Figure 8:
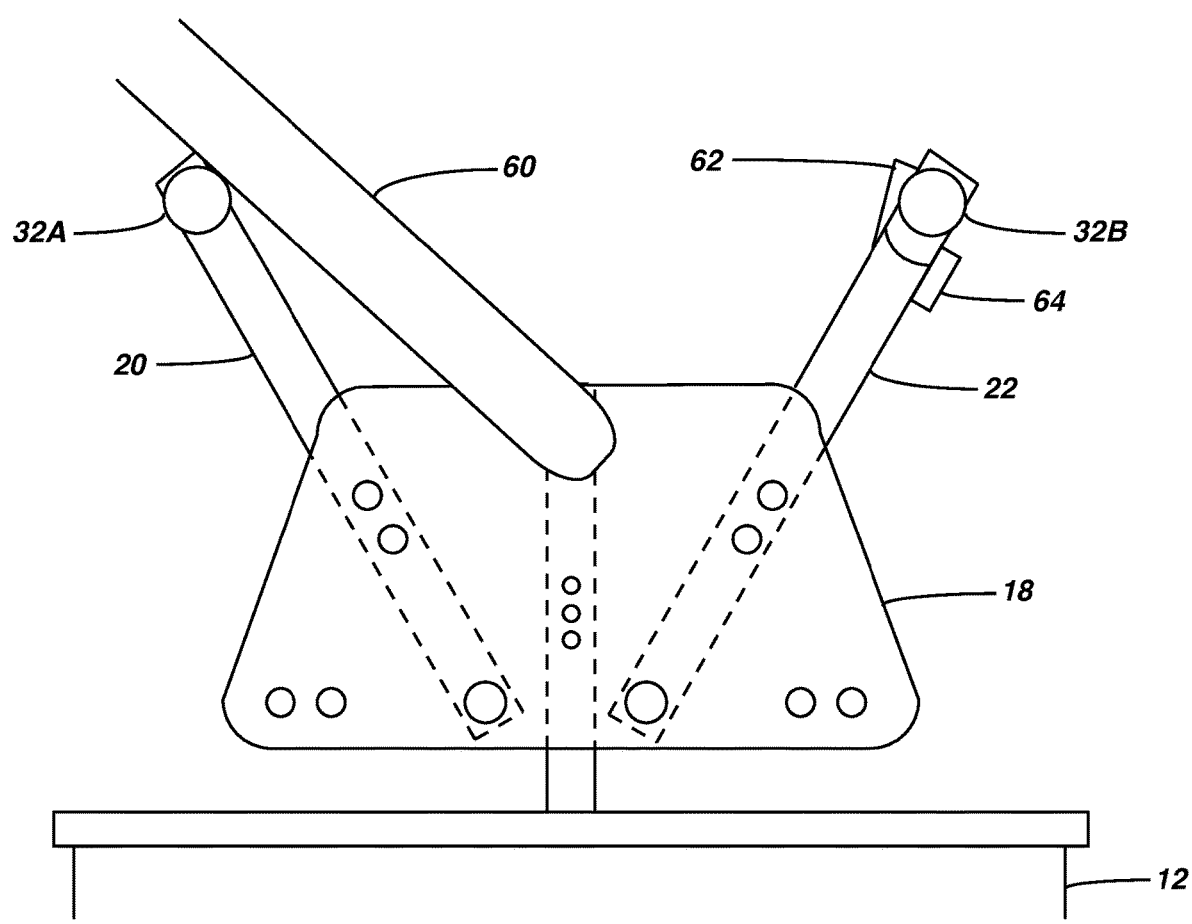
FIG. 8 shows a top view of a jackknife prevention device and attached trailer tongue according to one embodiment of the present disclosure.

Referring to FIG. 8, in operation, a trailer tongue 60 is mounted on the ball mount 24. The first arm 20 and second arm 22, which are located in the second position in FIG. 8, extend on either side of the trailer tongue 60. When an angle of the trailer tongue 60 exceeds a desired angle, the trailer tongue 60 contacts the bumper portion 32A and 32B of the first arm 20 and second arm 22 to prevent the trailer tongue 60 from exceeding a particular angle, thereby preventing the trailer tongue 60 or any portion of a trailer from contacting the vehicle 12.

In one embodiment, a contact switch 62 is located adjacent the bumper portion 32A and 32B of one or both of the first arm 20 and second arm 22. The contact switch 62 is in electronic communication with a control unit 64. The contact switch 62 is configured such that when the trailer tongue 60 contacts the jackknife prevention device 10, the contact switch 62 is closed. When the contact switch 62 is closed, the control unit 64 emits a warning to a driver of the vehicle 12 that the trailer tongue 60 has contacted the jackknife prevention device 10 and thereby preventing the driver from causing potential damage to the vehicle 12 or trailer being towed by the vehicle.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A jackknife prevention device installed adjacent a trailer hitch of a vehicle comprising:
   a base plate mounted at the trailer hitch of the vehicle adjacent to a ball mount of the trailer hitch;
   a first arm pivotally associated with the base plate at a proximal end of the first arm, the first arm including a bumper portion extending perpendicular to the first arm at a distal end of the first arm beyond an edge of the base plate, the first arm pivotable between a first position and second position;
   a second arm pivotally associated with the base plate at a proximal end of the second arm, the second arm including a bumper portion extending perpendicular to the second arm at a distal end of the second arm beyond the edge of the base plate, the second arm extending in a direction that is divergent from a direction of the first arm, the second arm pivotable between a first position and a second position;
   wherein in the first position the first arm and second arm are releasably engaged with the base plate to maintain the first arm and second arm such that the first arm and second arm are parallel to a back bumper of the vehicle; and
   wherein in the second position the first arm and second arm are releasably engaged with the base plate such that the first arm and second arm are retained at an angle between parallel and perpendicular to the back bumper of the vehicle, and wherein the bumper portion extending perpendicular to the first arm and the bumper portion extending perpendicular to the second arm contact sides of a trailer tongue mounted on the trailer hitch of the vehicle when the vehicle is turned in relation to the trailer tongue.

2. The jackknife prevention device of claim 1, each of the first arm and second arm further comprising a contact switch located adjacent to the bumper portion and a control module in electronic communication with the contact switch of the first arm and second arm, wherein the control module activates an alert when a portion of a trailer contacts either of the contact switches on the first arm and second arm.

3. The jackknife prevention device of claim 1, the base plate further comprising at least a first set of bores formed through the base plate corresponding to the first position of the first arm and second arm, the first set of bores aligned with bores formed through the proximal end of the first arm and the second arm.

4. The jackknife prevention device of claim 3, further comprising a second set of bores formed through the base plate corresponding to the second position of the first arm and second arm, the second set of bores aligned with the bores formed through the first arm and the second arm.

5. The jackknife prevention device of claim 4, further comprising one or more bolts inserted through one of the first set of bores and the second set of bores, and through the bores formed through the first arm and the second arm, wherein the one or more bolts inserted through one of the first set of bores secure the first arm and the second arm in the first position, and wherein the one or more bolts inserted through one of the second set of bores secure the first arm and second arm in the second position.

6. The jackknife prevention device of claim 3, the base plate further comprising a pair of retention mechanisms located adjacent the first set of bores formed through the base plates, the pair of retention mechanisms for securing one or more bolts through the first set of bores and the bores of the first arm and the second arm.

7. The jackknife prevention device of claim 6, the retention device comprising a retention member movably associated with the base plate between an open position and closed position, the retention member biased towards a closed position with a spring and shaped to engage a head of the one or more bolts to prevent the one or more bolts from backing out of the first set of bores.

8. The jackknife prevention device of claim 7, the head of the one or more bolts comprising a groove formed therein, wherein the retention member engages the groove of the head of the one or more bolts when the retention member is in the closed position.

9. The jackknife prevention device of claim 6, further comprising a second pair of retention mechanisms located adjacent a second set of bores formed through the base plates corresponding to the second position of the first arm and the second arm, the second pair of retention mechanisms for securing the one or more bolts through the second set of bores and the bores of the first arm and the second arm when the first arm and second arm are in the second position.

10. A jackknife prevention device installed adjacent a trailer hitch of a vehicle comprising:
  a base plate mounted at the trailer hitch of the vehicle adjacent to a ball mount of the trailer hitch, the base plate further including a first set of bores formed through the base plate and a second set of bores formed through the base plate;
  a first arm pivotally associated with the base plate at a proximal end of the first arm, the first arm including a bumper portion located at a distal end of the first arm and extending upwardly therefrom, the first arm further including at least one bore formed through the first arm and aligned with the first set of bores of the base plate when the first arm is in a first position and the second set of bores of the base plate when the first arm is in a second position;
  a second arm pivotally associated with the base plate at a proximal end of the second arm and extending upwardly therefrom, the second arm including a bumper portion located at a distal end of the second arm, the second arm further including at least one bore formed through the second arm and aligned with the first set of bores of the base plate when the second arm is in a first position and the second set of bores of the base plate when the second arm is in a second position, the second arm extending in a direction that is divergent from a direction of the first arm;
  wherein in the first position the first arm and second arm are releasably engaged with the base plate with one or more bolts inserted through one of the first and second set of bores and the bores on the first arm and the second arm to maintain the first arm and second arm in one of the first and second positions and;
  wherein in the second position the first arm and second arm are releasably engaged with the base plate such that the first arm and second arm are retained at an angle between parallel and perpendicular to the back bumper of the vehicle, and wherein the upwardly extending bumper portion of the first arm and the second arm contacts a trailer tongue mounted on the trailer hitch of the vehicle when the vehicle is turned in relation to the trailer tongue.

* * * * *